United States Patent
Avudaiappan et al.

(10) Patent No.: US 11,504,559 B2
(45) Date of Patent: Nov. 22, 2022

(54) SHAPE MEMORY ALLOY ACTUATED FIRE AND OVERHEAT DETECTOR

(71) Applicant: Kidde Technologies, Inc., Wilson, NC (US)

(72) Inventors: Thambiraj Avudaiappan, Karanataka (IN); Scott Kenneth Newlin, Willow Spring, NC (US); Dharmendr Len Seebaluck, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 433 days.

(21) Appl. No.: 16/691,682

(22) Filed: Nov. 22, 2019

(65) Prior Publication Data

US 2021/0038933 A1 Feb. 11, 2021

(30) Foreign Application Priority Data

Jul. 3, 2019 (IN) .............................. 201911026687

(51) Int. Cl.
| | |
|---|---|
| *G01K 5/00* | (2006.01) |
| *A62C 3/08* | (2006.01) |
| *B64D 25/00* | (2006.01) |
| *G01K 5/48* | (2006.01) |

(52) U.S. Cl.
CPC ................ *A62C 3/08* (2013.01); *B64D 25/00* (2013.01); *G01K 5/483* (2013.01)

(58) Field of Classification Search
CPC combination set(s) only.
See application file for complete search history.

(56) References Cited

U.S. PATENT DOCUMENTS

| | | | |
|---|---|---|---|
| 7,671,717 B2 | 3/2010 | Zhang et al. | |
| 9,429,480 B2 | 8/2016 | Smith et al. | |
| 9,524,841 B2 | 12/2016 | Rennie et al. | |
| 9,748,062 B2 | 8/2017 | Pinto, IV et al. | |

(Continued)

FOREIGN PATENT DOCUMENTS

| | | | | |
|---|---|---|---|---|
| WO | 2005022478 A1 | 3/2005 | | |
| WO | WO-2005022478 A1 * | 3/2005 | ............. | G08B 17/06 |
| WO | 2008127028 A1 | 10/2008 | | |

OTHER PUBLICATIONS

European Search Report for Application No. 19212806.4, dated Jun. 12, 2020, 57 pages.

*Primary Examiner* — Lisa M Caputo
*Assistant Examiner* — Nasir U. Ahmed
(74) *Attorney, Agent, or Firm* — Cantor Colburn LLP

(57) ABSTRACT

A linear detector element includes an outer sheath having a first end and a second end, one or more shape memory responsive elements within the outer sheath and between the first end and the second end and first and second conductive wires passing through at least a portion of the outer sheath and through the one or more shape memory responsive elements. The one more shape memory responsive elements include a shape memory actuator surrounding the first and second conductive wires and that has an expanded size and a contracted size and that is sized and arranged such that when the shape memory actuator is in the contracted state the first and second conductive wires contact one another and when the shape memory actuator is in the expanded state the first and second conductive wires do not contact one another.

18 Claims, 3 Drawing Sheets

(56) References Cited

U.S. PATENT DOCUMENTS

| | | | | |
|---|---|---|---|---|
| 2003/0188677 A1* | 10/2003 | Akers | ............... | G01K 3/04 |
| | | | | 374/E3.004 |
| 2010/0142584 A1* | 6/2010 | Harrington | ............ | G08B 17/06 |
| | | | | 374/E7.001 |
| 2016/0093186 A1* | 3/2016 | Pinto, IV | ............ | H01H 37/323 |
| | | | | 340/593 |
| 2016/0307718 A1* | 10/2016 | Geier | ................ | H01H 47/002 |
| 2016/0314918 A1* | 10/2016 | Skurkis | ............. | G01D 11/245 |

* cited by examiner

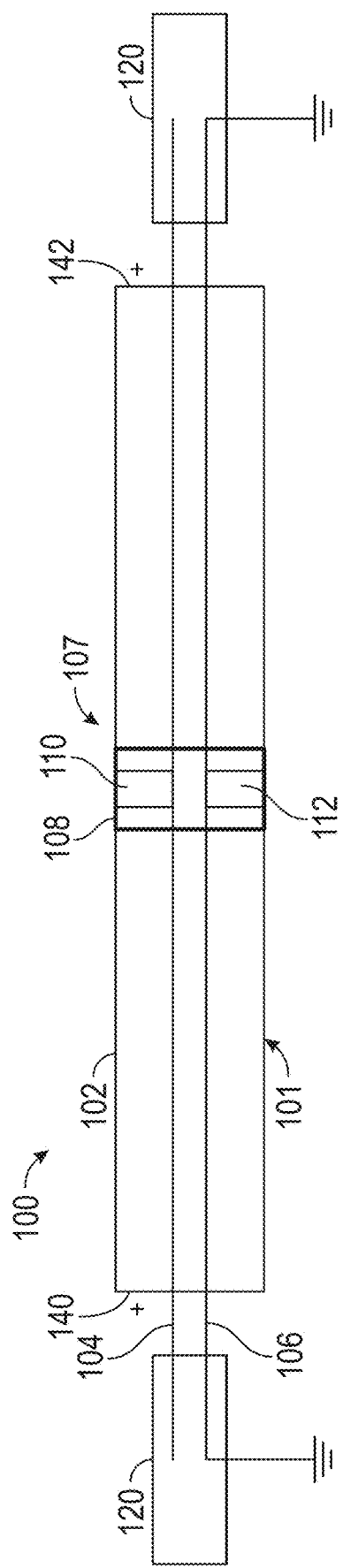
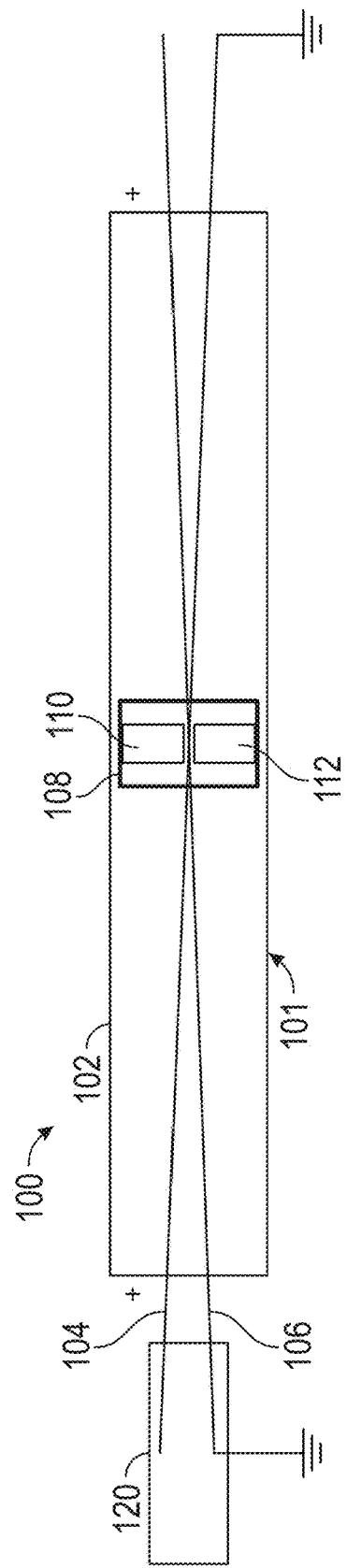
FIG. 1
FIG. 2

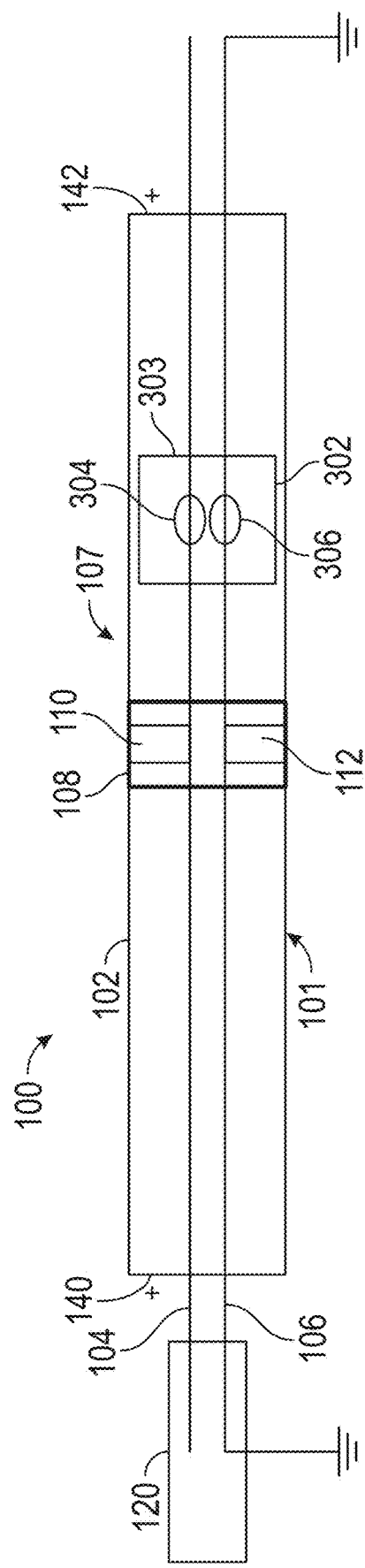
FIG. 3
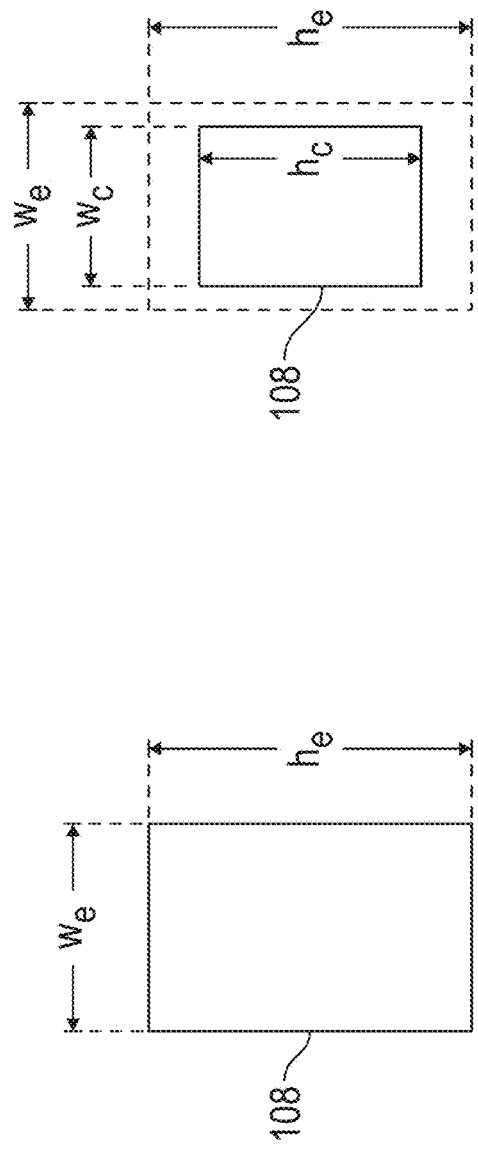
FIG. 4A
FIG. 4B

SHAPE MEMORY ALLOY ACTUATED FIRE AND OVERHEAT DETECTOR

FOREIGN PRIORITY

This application claims priority to Indian Patent Application No. 201911026687 filed Jul. 3, 2019, the entire contents of which is incorporated herein by reference.

BACKGROUND

Exemplary embodiments pertain to the art of heat and fire detectors and that can be used in heat/fire detection systems. Such detection systems may include a shape memory element that is responsive to heat.

A variety of systems exist to sense temperatures and temperature changes for fire and overheat detection in a wide range of applications, including industrial and aerospace applications. Linear systems use elongated sensing elements that extend from a detector into one or more sensing regions. Although some systems use a separate detector for each sensing element, many systems join a plurality of sensing elements to single detector. Detectors sense temperature along the sensing elements, and compare temperatures and rates of temperature change with preselected or computed thresholds to flag overheat conditions. Detectors that sense overheat temperatures above a designated threshold may trigger an alarm in a variety of ways, such as by signaling a central control or monitoring system, activating lights or alarms, or storing an alarm event in a maintenance log.

Examples of digital linear detectors include digital alarmline, salt detectors, and pneumatic detectors, each with associated advantages and disadvantages. Digital alarmline use twisted pairs of conductors separated by a polymer insulator that softens or melts when subjected to temperatures above a threshold, allowing adjacent conductors to electrically contact one another. Digital alarmline is simple and inexpensive, but cannot reset, and must be replaced after each alarm. Salt detectors utilize eutectic inorganic salts as variable impedance elements that come into conduction to close an electrical contact when exposed to high temperatures. Salt detectors must be continuously AC powered during operation to avoid polarization effects. Some examples of pneumatic detectors use gases that are evolved from a solid core when heated, producing an increase in fluid pressure within the sensing element that is detected with a diaphragm switch or other pressure sensor. The evolved gas is only partially reabsorbed when the solid core of a pneumatic detector cools, causing a gradual decrease in detector sensitivity.

Each of the above systems typically require at least 6 inches (minimum) be heated in order to sense a fire/overheat condition.

SUMMARY

Disclosed is a linear detector element for an overheat condition sensing system. The element includes an outer sheath having a first end and a second end, one or more shape memory responsive elements within the outer sheath and between the first end and the second end and first and second conductive wires passing through at least a portion of the outer sheath and through the one or more shape memory responsive elements. The one more shape memory responsive elements include a shape memory actuator surrounding the first and second conductive wires and that has an expanded size and a contracted size and that is sized and arranged such that when the shape memory actuator is in the contracted state the first and second conductive wires contact one another and when the shape memory actuator is in the expanded state the first and second conductive wires do not contact one another.

In an element of any prior embodiment, the outer sheath and the one or more shape memory responsive elements contact one another when the shape memory actuator is the expanded state.

In an element of any prior embodiment, the outer sheath and the one or more shape memory responsive elements have a same cross sectional shape when the shape memory actuator is the expanded state.

In an element of any prior embodiment, the outer sheath and the one or more shape memory responsive elements have a rectangular cross sectional shape.

In an element of any prior embodiment, the one or more shape memory responsive elements each have insulating elements portions disposed within the SMA actuator that contact the first and second conductive wires.

In an element of any prior embodiment, the first conductive wire is configured to be connected to a power source and the second conductive line is configured to be connected to ground.

In an element of any prior embodiment, the element further includes at least one separator element disposed with the sheath and surrounding the first and second conductive wires and configured such that the first and second conductive wires are electrically separated from one another when the SMA actuator is in the expanded state.

In an element of any prior embodiment, the one more shape memory responsive elements include a first shape memory responsive element and a second first shape memory responsive element and the at least one separator element is disposed between the first shape memory responsive element and the second first shape memory responsive element.

In an element of any prior embodiment, wherein the at least on separator element includes first and second insulators, the first insulator surrounding the first conductive wire and the second insulator surrounding the second conductive wire.

In an element of any prior embodiment, the first and second insulators are ceramic.

Also disclosed is an aircraft duct overheat condition sensing system, that includes a linear detector element of any prior embodiment. The system can also include a controller electrically connected to the first and second conductive wires and configured to determine when the first and second conductive wires are contacting one another.

BRIEF DESCRIPTION OF THE DRAWINGS

The following descriptions should not be considered limiting in any way. With reference to the accompanying drawings, like elements are numbered alike:

FIG. 1 is a side-view of a heat/fire detecting system according to one embodiment in a normal operation state;

FIG. 2 is a side-view of the heat/fire detecting system of FIG. 1 in an overheat or fire detected operation state; and FIG. 3 is a side-view of a heat/fire detecting system according to one embodiment in a normal operation state;

FIGS. 4A and 4B show examples of cross-sections of a shape memory alloy actuator in its expanded and contracted state.

DETAILED DESCRIPTION

Figure 5:
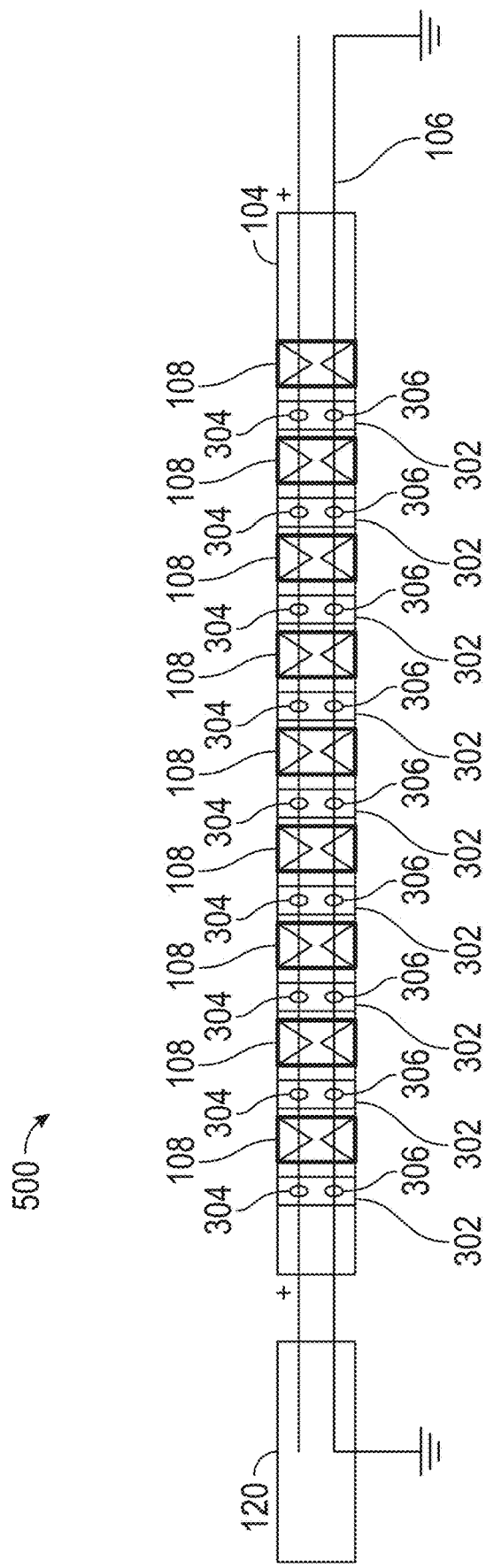
FIG. 5 is a side-view of another example of a heat/fire detecting system according to one embodiment in a normal operation state.

A detailed description of one or more embodiments of the disclosed apparatus and method are presented herein by way of exemplification and not limitation with reference to the Figures.

Disclosed herein is fire or overheat detection system that includes a linear detector element. The linear detector unit includes shape memory alloy portion that, when exposed to heat causes two electrical lines to be connected to one another. The detector can be used, for example, in a bleed duct of an aircraft in one embodiment to detect fire or overheat conditions therein. In contrast to the prior art eutectic salt elements the disclosed SMA actuator can run on DC or AC instead of AC only. Running on DC means it can be monitored by other aircraft data acquisition systems or potentially be as simple as feeding a lamp.

In one embodiment, the system 100 includes a linear detector element 101. The linear detector element 101 has an outer boundary defined by a sheath or other outer casing as generally shown by reference element 102 and referred to as a sheath herein. This sheath 102 can be shaped as needed but generally has a first end 140 and a second end 142. The sheath 102 can be formed of any type of metal or other rigid material that can withstand exposure to heat. In one embodiment, the sheath 102 is formed of Inconel.

The linear detector element 101 also includes two conductive wires 104, 106. The first conductive wire 104 is a main power wire and the second conductive wire 106 is a ground or common wire. That is, while shown connected to "ground" the second conductive wire can be connected to a low reference voltage (e.g., an offset DC voltage that is lower than the voltage in the first conductive wire 104). The first and second conductive wire 104, 106 can be formed on any current carrying material and, in one embodiment, are formed of nickel.

The first and second wires 104, 106 can be connected to a controller 120 that is configured to determine the electrical state of the first and second wires 104, 106. In one embodiment this can include determining if the voltage of on the first and second wires 104, 106 is the same. This can indicate that the first and second wires 104, 106 are in contact. The controller 120 can include portions on both ends as illustrated or in a single end.

The linear detector element 101 also include at least one shape memory responsive element 107. The shape memory responsive element 107 in FIG. 1 and any other figure can includes a shape memory alloy (SMA) actuator 108. Herein, an SMA is any alloy that transitions from an original or expanded state to a collapsed or contracted state when exposed heat above a certain level. In one embodiment, such an SMA will expand back to its original state after cooling but this is not required. Examples of shape-memory alloys are copper-aluminium-nickel, and nickel-titanium (NiTi) alloys. Other SMAs can also be created by alloying zinc, copper, gold and iron.

The SMA actuator 108 can be formed of a shape memory alloy that, when exposed to heat causes one or more sides thereof to contract. For example, and as shown in FIG. 4A, the SMA actuator 108 can have a first, expanded, configuration. As shown, the SMA actuator 108 includes an expanded height ($h_e$) and an expanded width ($w_e$).

FIG. 4B shows the SMA actuator 108 in a contracted state. When in the contract state, one or more sides or edges of the SMA actuator 108 contracts or otherwise becomes smaller. In FIG. 4B an outline of the shape shown in FIG. 4A is shown in dashed lines to provide context but is not necessarily to scale. As shown, the SMA actuator 108 includes a contracted height ($h_c$) and a contracted width ($w_c$).

The particular shape of the SMA actuator 108 is not limited to the rectangular shape as illustrated herein and could, in one embodiment, be formed as a circle, a triangle or any other geometric shape or can be formed to a particular desired shape whether or not such shape is geometric in nature.

With reference again to FIG. 1, in one embodiment, the SMA actuator 108 has the same shape (in cross section) as the sheath 102 FIG. 1 when in its expanded shape. Stated differently, the shape memory responsive element 107 has the same shape as the sheath when in its expanded shape.

The shape memory responsive element 107 includes one or more insulating elements 110, 112 disposed on the inner surface of the SMA actuator 108. The one or more insulating elements 110, 112 can be implemented as two pieces or strips of ceramic in one embodiment. The one or more insulating elements 110, 112 can be shaped and arranged such when the shape memory responsive element 107 moves from the expanded state (e.g., in FIG. 1) to a contracted state (e.g., in FIG. 2), the first and second wires 104, 106 are brought into contact with each other.

The move from the expanded state can occur for example, the sheath 102 is exposed to heat. Due to the close proximity of the sheath 102 and the memory responsive element 107 in general and the SMA actuator 108 in particular, the heat is transferred from the sheath 102 to the SMA actuator 108 causing the SMA actuator 108 to transition from the expanded state to the contracted state. When this occurs, the wires 104, 106 contact one another and the control unit 120 can determine that a short has occurred.

In one embodiment, the control 120 can include a power supply to provide the main power and one or more sensors (such as a current/voltage sensor or ohm meter) to that can determine that the wires 104, 106 are in contact.

In one embodiment, the linear detector element can include one or more separator elements that serve to keep the wires 104, 106 from accidently touching when the SMA actuator 108 is in the expanded state.

As illustrated in FIG. 3, in one embodiment the linear detector element 101 can include at least one separator element 302. As discussed above, the separator element 107 can be any implement that keep the wires 104, 106 from touching (e.g., electrically isolated from one another) when the SMA actuator 108 is in the expanded state.

FIG. 3 shows a specific example of a separator element 302 can include an outer housing 303 that can enclose or more insulating elements 304, 306. The insulating elements 304, 306 are formed of ceramic in one embodiment. As will be understood, the linear detector element 101 can include any number of separator elements 302. For instance, there could be another separator element 302 on the other side of the shape memory responsive element 107. In one embodiment, multiple shape memory responsive element 107 are included in the linear detector element 101. In such a case, each shape memory responsive element 107 can be separated from a neighboring shape memory responsive element 107.

FIG. 5 shows another embodiment that of linear detector element 500. This actuator can be coupled to any of the controllers as described above. The linear detector element 500 has an outer boundary defined by a sheath 102 that has a first end 140 and a second end 142. The sheath 102 can be formed of any type of metal or other rigid material that can withstand exposure to heat. In one embodiment, the sheath 102 is formed on Inconel.

Enclosed in the sheath 102 of the linear detector element 500 are a plurality of shape memory responsive elements 107 each separated by a separator element 302. The exact configuration of separator element 302/shape memory responsive elements 107 can be modified based on condition.

The linear actuator 500, as above, also includes two conductive wires 104, 106. The first conductive wire 104 is a main power wire and the second conductive wire 106 is a ground or common wire. That is, while shown connected to "ground" the second conductive wire can be connected to a low reference voltage (e.g., an offset DC voltage that is lower than the voltage in the first conductive wire 104). The first and second conductive wire 104, 106 can be formed on any current carrying material and, in one embodiment, are formed of nickel.

As will be understood, the controller 120 can determine which shape memory responsive element 107 has transitioned to a collapsed state (e.g., is exposed to heat) by measuring an electrical property such as resistance of the wires 104, 106 when they are connected to one another.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to one embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft duct overheat condition sensing system, comprising:
   a linear detector element, including:
   an outer sheath having a first end and a second end;
   one or more shape memory responsive elements within the outer sheath and between the first end and the second end; and
   first and second conductive wires passing through at least a portion of the outer sheath and through the one or more shape memory responsive elements;
   wherein the one more shape memory responsive elements include a shape memory actuator surrounding the first and second conductive wires and that has an expanded size and a contracted size and that is sized and arranged such that when the shape memory actuator is in the contracted state the first and second conductive wires contact one another and when the shape memory actuator is in the expanded state the first and second conductive wires do not contact one another;
   wherein the linear detector element further includes at least one separator element surrounding the first and second conductive wires and configured such that the first and second conductive wires are electrically separated from one another when the SMA actuator is in the expanded state; and
   a controller electrically connected to the first and second conductive wires and configured to determine when the first and second conductive wires are contacting one another.

2. The system of claim 1, wherein the outer sheath and the one or more shape memory responsive elements contact one another when the shape memory actuator is the expanded state.

3. The system of claim 2, wherein the outer sheath and the one or more shape memory responsive elements have a same cross sectional shape when the shape memory actuator is the expanded state.

4. The system of claim 3, wherein the outer sheath and the one or more shape memory responsive elements have a rectangular cross sectional shape.

5. The system of claim 2, wherein the one or more shape memory responsive elements each have insulating elements portions disposed within the SMA actuator that contact the first and second conductive wires.

6. The system of claim 2, wherein the first conductive wire is connected to a power source and the second conductive line is connected to ground.

7. The system of claim 1, wherein the one more shape memory responsive elements include a first shape memory responsive element and a second first shape memory responsive element and the at least one separator element is between the first shape memory responsive element and the second first shape memory responsive element.

8. The system of claim 7, wherein the first and second insulators are ceramic.

9. The system of claim 1, wherein the at least one separator element includes first and second insulators, the first insulator surrounding the first conductive wire and the second insulator surrounding the second conductive wire.

10. A linear detector element for an overheat condition sensing system, including:
    an outer sheath having a first end and a second end;
    one or more shape memory responsive elements within the outer sheath and between the first end and the second end;
    first and second conductive wires passing through at least a portion of the outer sheath and through the one or more shape memory responsive elements;
    wherein the one more shape memory responsive elements include a shape memory actuator surrounding the first and second conductive wires and that has an expanded size and a contracted size and that is sized and arranged such that when the shape memory actuator is in the contracted state the first and second conductive wires contact one another and when the shape memory actuator is in the expanded state the first and second conductive wires do not contact one another; and at least one separator element disposed with the sheath and surrounding the first and second conductive wires and configured such that the first and second conductive wires are electrically separated from one another when the SMA actuator is in the expanded state.

11. The linear detector element of claim 10, wherein the outer sheath and the one or more shape memory responsive elements contact one another when the shape memory actuator is the expanded state.

12. The linear detector element of claim 11, wherein the outer sheath and the one or more shape memory responsive elements have a same cross sectional shape when the shape memory actuator is the expanded state.

13. The linear detector element of claim 12, wherein the outer sheath and the one or more shape memory responsive elements have a rectangular cross sectional shape.

14. The linear detector element of claim 11, wherein the one or more shape memory responsive elements each have insulating elements portions disposed within the SMA actuator that contact the first and second conductive wires.

15. The linear detector element of claim 11, wherein the first conductive wire is configured to be connected to a power source and the second conductive line is configured to be connected to ground.

16. The linear detector element of claim 10, wherein the one more shape memory responsive elements include a first shape memory responsive element and a second first shape memory responsive element and the at least one separator element is disposed between the first shape memory responsive element and the second first shape memory responsive element.

17. The linear detector element of claim 10, wherein the at least on separator element includes first and second insulators, the first insulator surrounding the first conductive wire and the second insulator surrounding the second conductive wire.

18. The linear detector element of claim 17, wherein the first and second insulators are ceramic.

* * * * *